April 16, 1940.  F. P. JACKSON  2,197,409
STEERING WHEEL COVER
Filed June 30, 1939
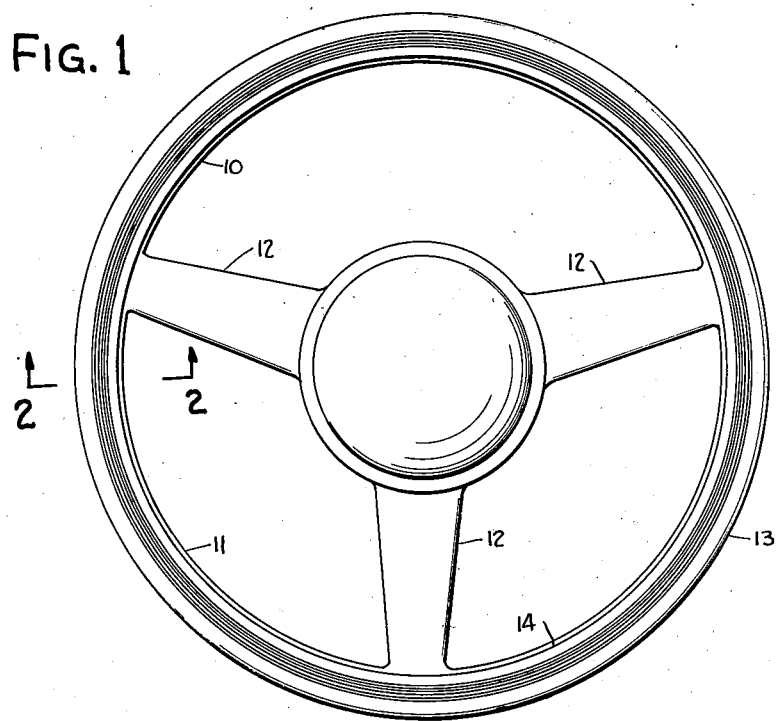
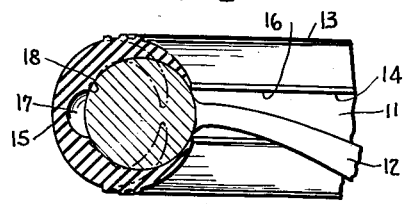
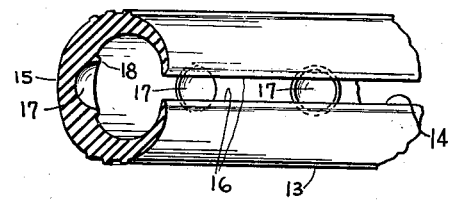
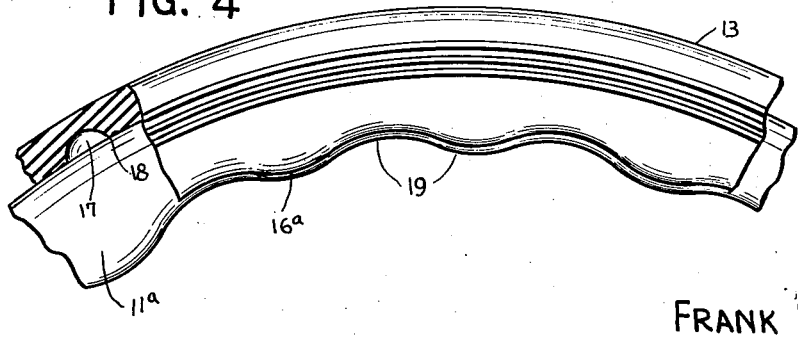
INVENTOR
FRANK P. JACKSON
BY
*J Ralph Barrow*
ATTORNEY Patented Apr. 16, 1940

2,197,409

UNITED STATES PATENT OFFICE 2,197,409

STEERING WHEEL COVER

Frank P. Jackson, Antonio, Tex.

Application June 30, 1939, Serial No. 282,103

3 Claims. (Cl. 74—558)

This invention relates to covers for steering wheels, or the like.

An object of this invention is to provide an improved steering wheel cover having smooth, comfortable gripping surfaces.

Another object of the invention is to provide an improved elastic cover which will adhere tightly to the steering wheel, so as not to slip, twist or buckle when the wheel is gripped.

These and other objects will be manifest from the following brief description and the accompanying drawing.

Of the accompanying drawing:

Figure 1 is a top plan view of a steering wheel having an improved cover embodying the invention in place thereon.

Figure 2 is a cross-section taken on line 2—2 of Figure 1.

Figure 3 is a fragmentary section of the cover in its normal molded or vulcanized shape.

Figure 4 is a fragmentary view, partly broken away and in section, showing the improved cover applied to another type of steering wheel.

Referring to the drawing, the numeral 10 designates the conventional steering wheel having the usual annular rim 11 and spokes 12, 12. The cover is designated by the numeral 13 and is formed as an annular casing having a circumferential slit 14 about the inner edge thereof to receive the rim. The cover 13 may be of elastic or resilient material, such as rubber or the like, and preferably is of such size that it must be stretched to apply it over the rim.

As best shown in Figure 3, cover 13 may be relatively thick about the outer peripheral portion 15 thereof and tapered gradually toward the edge portions 16, 16 adjacent the slit 14. The casing may be molded or vulcanized substantially elongate or oblong in transverse section, with the internal depth of the casing through the radial center thereof substantially less than the thickness of the corresponding portion of rim 11, so that when the cover is applied over the rim, the edge portions 16, 16 will be urged or distorted outwardly against the inherent tendency thereof to return to normal molded positions (see Figure 2). This construction is such that when the cover is applied over the rim 11, the inherent contractile quality of the cover sets up forces therein extending in opposite directions from the outer periphery of the cover toward the edges 16 of the slit, these forces tending to wrap the side portions of the casing inwardly around the rim 11 tightly to grip the cover thereon.

On the inner periphery of the casing 13 there may be a plurality of suction cups 17, having annular bead portions 18 about the edges thereof. These suction cups are arranged to engage the smooth surfaces of rim 11, so that a vacuum will be created therein to adhere the cover to the rim. The resultant of the opposing forces extending around the transverse section of the cover from the central portion thereof tends to urge and retain the vacuum or suction cups 17 in tight effective engagement with the surface of the rim.

Figure 4 illustrates the application of cover 13 for use with a type of steering wheel 11a having smooth corrugations 19 about the inner periphery thereof, the inherent contractile quality of cover 13 urging the relatively thin tapered edge portions 16a tightly to conform to the undulating surfaces of the corrugations 19, and thereby maintaining a smooth gripping quality of the same.

Thus has been provided a simple, inexpensive cover of the character described, which will cling tightly to a steering wheel, and which will not slip, twist or buckle when handled. The improved cover provides a smooth, comfortable grip which materially reduces the fatigue of driving an automobile, and makes such driving safer because of the relatively soft non-skid effect added to the usual hard, smooth surfaces of the steering wheel.

What is claimed is:

1. A cover for steering wheels, comprising a continuous casing of elastic or resilient material, said casing having a slit along an edge thereof for receiving a steering wheel, and suction means on the inner surface of said casing for adhering the casing to the surface of said wheel, the depth of said casing from adjacent said slit being less than the thickness of the corresponding portion of the wheel, whereby the walls of the casing adjacent said slit will be distorted by the wheel to grip the same by the inherent tendency of the casing to resume normal shape.

2. A cover for steering wheels, comprising an annular casing of elastic or resilient material, said casing having a circumferential slit about the inner edge thereof for receiving a steering wheel, and suction means on the inner surface of said casing for adhering the casing to the surface of said wheel, the transverse section of said casing having a radial depth of less than the radial thickness of the steering wheel, whereby the walls of the casing adjacent said slit will be distorted by the wheel to grip the same by the inherent tendency of the casing to resume normal shape.

3. A cover for steering wheels, comprising an annular casing of elastic or resilient material, said casing having a circumferential slit about the inner edge thereof for receiving a steering wheel, the transverse section of said casing having a radial depth of less than the radial thickness of the steering wheel, whereby the walls of the casing adjacent said slit will be distorted by the wheel to grip the same by the inherent tendency of the casing to resume normal shape, the walls of said casing being smoothly tapered to the edges of said slit.

FRANK P. JACKSON.